US010432335B2

(12) United States Patent
Bretherton

(10) Patent No.: US 10,432,335 B2
(45) Date of Patent: Oct. 1, 2019

(54) METHOD AND SYSTEM FOR REAL-TIME BROADCAST AUDIENCE ENGAGEMENT

(71) Applicant: Peter Bretherton, Crosby, TX (US)

(72) Inventor: Peter Bretherton, Crosby, TX (US)

( * ) Notice: Subject to any disclaimer, the term of this patent is extended or adjusted under 35 U.S.C. 154(b) by 0 days.

(21) Appl. No.: 16/413,782

(22) Filed: May 16, 2019

(65) Prior Publication Data

US 2019/0273570 A1 Sep. 5, 2019

Related U.S. Application Data

(63) Continuation of application No. PCT/US2017/059703, filed on Nov. 2, 2017.

(51) Int. Cl.
| | | |
|---|---|---|
| *H04H 60/32* | (2008.01) | |
| *H04H 60/33* | (2008.01) | |
| *G06Q 30/02* | (2012.01) | |
| *H04H 60/31* | (2008.01) | |
| *H04N 21/442* | (2011.01) | |

(52) U.S. Cl.
CPC ......... *H04H 60/33* (2013.01); *G06Q 30/0201* (2013.01); *H04H 60/31* (2013.01); *H04N 21/44218* (2013.01)

(58) Field of Classification Search
CPC .............................................. H04N 21/44218
USPC .......................................................... 725/14
See application file for complete search history.

(56) References Cited

U.S. PATENT DOCUMENTS

| | | | | |
|---|---|---|---|---|
| 2002/0042920 A1* | 4/2002 | Thomas | ............... | G06F 3/0481 725/87 |
| 2002/0056087 A1* | 5/2002 | Berezowski | ........... | G06Q 30/02 725/9 |
| 2007/0124756 A1* | 5/2007 | Covell | ................... | G06Q 30/02 725/18 |
| 2007/0271518 A1* | 11/2007 | Tischer | ................. | H04H 60/31 715/744 |
| 2007/0271580 A1* | 11/2007 | Tischer | ................. | H04H 60/07 725/35 |
| 2008/0086742 A1 | 4/2008 | Aldrey et al. | | |
| 2013/0247081 A1 | 9/2013 | Vinson et al. | | |

(Continued)

OTHER PUBLICATIONS

International search report of International Search Authority (USPTO) for PCT international application PCT/US2017/059703 filed on Nov. 2, 2017.

(Continued)

*Primary Examiner* — Michael B. Pierorazio
(74) *Attorney, Agent, or Firm* — Basil M. Angelo; Angelo IP

(57) ABSTRACT

A method and system for real-time broadcast audience engagement includes identifying a plurality of shows currently being broadcast live, providing a list of shows currently being broadcast to an audience member, receiving the audience member's selection of a show from the list, providing the audience member with a binary reaction interface for the selected show, receiving the audience member's binary reaction based on the audience member's interaction with the binary reaction interface, aggregating binary reactions from a plurality of audience members for the selected show, and providing the selected show a real-time summary of the plurality of binary reactions from the plurality of audience members.

22 Claims, 16 Drawing Sheets

(56) References Cited

U.S. PATENT DOCUMENTS

2014/0123191 A1   5/2014   Hahn et al.

OTHER PUBLICATIONS

Written opinion of International Search Authority (USPTO) for PCT international application PCT/US2017/059703 filed on Nov. 2, 2017.

* cited by examiner

210

345

RETURN TO DASHBOARD

Show Name
METRICS

525

Select dates and frequency of Metrics:

Start Date:   through   End Date:

○ Month   ○ Week   ○ Day

530

Select emails to receive Metrics data:
(Metrics data is confidential property of this show)

○ showhost@email.com
○ showproducer@email.com
○ programdirector@email.com
○ stationmanager@email.com

SUBMIT
If you need to modify your distribution list for your metrics
data, please email showsupport@email.com

RETURN TO DASHBOARD

Show Name
SETTINGS

535

540

CHANGE PASSWORD
Current Password

[ ]

Password must be between 8 and 12 characters, must contain at least one lower case letter, at least one number, and at least one special character New Password

[ ]

Re-enter New Password

[ ]

SUBMIT

CHANGE NAME
The current show name is
Show Name

The show name can be up to 21 characters in length. It may not contain any special characters. The name will reflect any capitalizations entered.

New Show Name

[ ]

Re-enter New Show Name

[ ]

SUBMIT

CHANGE Web Address — 545

[ ]

SUBMIT

RETURN TO DASHBOARD

Show Name
ADVERTISERS

560

565

| Nickname | [     ] | Full name | [     ] |

| Link | [     ] | Discount Code | [     ] |

570

Advertisement Verbiage

Line 1 – Up to xx characters
[                    ]

Line 2 – Up to xx characters
[                    ]

Line 3 – Up to xx characters
[                    ]

Line 4 – Up to xx characters
[                    ]

Ad Graphic
Graphic must be xxx by xxx pixels

[                    ]

Upload graphic
[                    ]

Browse            Select

SUBMIT            DELETE AD

FIG. 5E

METHOD AND SYSTEM FOR REAL-TIME BROADCAST AUDIENCE ENGAGEMENT

CROSS-REFERENCE TO RELATED APPLICATIONS

This application is a continuation of PCT International Application PCT/US2017/059703, filed on Apr. 30, 2018, which is incorporated by reference in its entirety.

BACKGROUND OF THE INVENTION

Broadcasting includes the live transmission of audio and/or visual content to a wide audience. Conventional means of broadcasting include terrestrial and satellite transmission of content. More recent means of broadcasting include streamed, podcast, and any other type or kind of internet enabled, or widely accessible, live content. Audience members typically consume broadcast content via conventional means such as radio or television receivers and increasingly via more modern means such as smartphones, tablets, laptops, and other personal computing devices. In this age of ubiquitous connectivity, audience members typically have access to one or more devices capable of receiving broadcast content at all times. Consequently, there is more broadcast content, and competition for audience engagement, than ever before.

While the nature of broadcasting has changed, broadcasters still seek to monetize their content, typically based on the sale of advertisements that run during a broadcast. Advertisement rates are typically tied to one or more metrics of audience engagement, such as, for example, ratings. Broadcast shows with higher ratings typically command higher advertisement rates. As such, broadcast shows have a vested financial interest in their audience engagement. Conventional metrics of broadcast audience engagement include surveys, ratings, call-in lines, and social media, each of which is substantially limited in scope and typically only appeal to a very small segment of the broadcast audience. Moreover, these conventional metrics of broadcast audience engagement lack immediacy and provide feedback to broadcasters well after a broadcast has already concluded.

BRIEF SUMMARY OF THE INVENTION

According to one aspect of one or more embodiments of the present invention, a method of real-time broadcast audience engagement includes identifying a plurality of shows currently being broadcast live, providing a list of shows currently being broadcast to an audience member, receiving the audience member's selection of a show from the list, providing the audience member with a binary reaction interface for the selected show, receiving the audience member's binary reaction based on the audience member's interaction with the binary reaction interface, aggregating binary reactions from a plurality of audience members for the selected show, and providing the selected show a real-time summary of the plurality of binary reactions from the plurality of audience members.

According to one aspect of one or more embodiments of the present invention, a non-transitory computer readable medium includes software instructions that, when executed by a processor, perform a method of real-time broadcast audience engagement that includes identifying a plurality of shows currently being broadcast live, providing a list of shows currently being broadcast to an audience member, receiving the audience member's selection of a show from the list, providing the audience member with a binary reaction interface for the selected show, receiving the audience member's binary reaction based on the audience member's interaction with the binary reaction interface, aggregating binary reactions from a plurality of audience members for the selected show, and providing the selected show a real-time summary of the plurality of binary reactions from the plurality of audience members.

Other aspects of the present invention will be apparent from the following description and claims.

BRIEF DESCRIPTION OF THE DRAWINGS

FIG. 5B shows a metrics interface of a client-side software application for real-time broadcast audience engagement in accordance with one or more embodiments of the present invention.

FIG. 5C shows a settings interface of a client-side software application for real-time broadcast audience engagement in accordance with one or more embodiments of the present invention.

FIG. 5E shows an advertiser interface of a client-side software application for real-time broadcast audience engagement in accordance with one or more embodiments of the present invention.

DETAILED DESCRIPTION OF THE INVENTION

Figure 1:
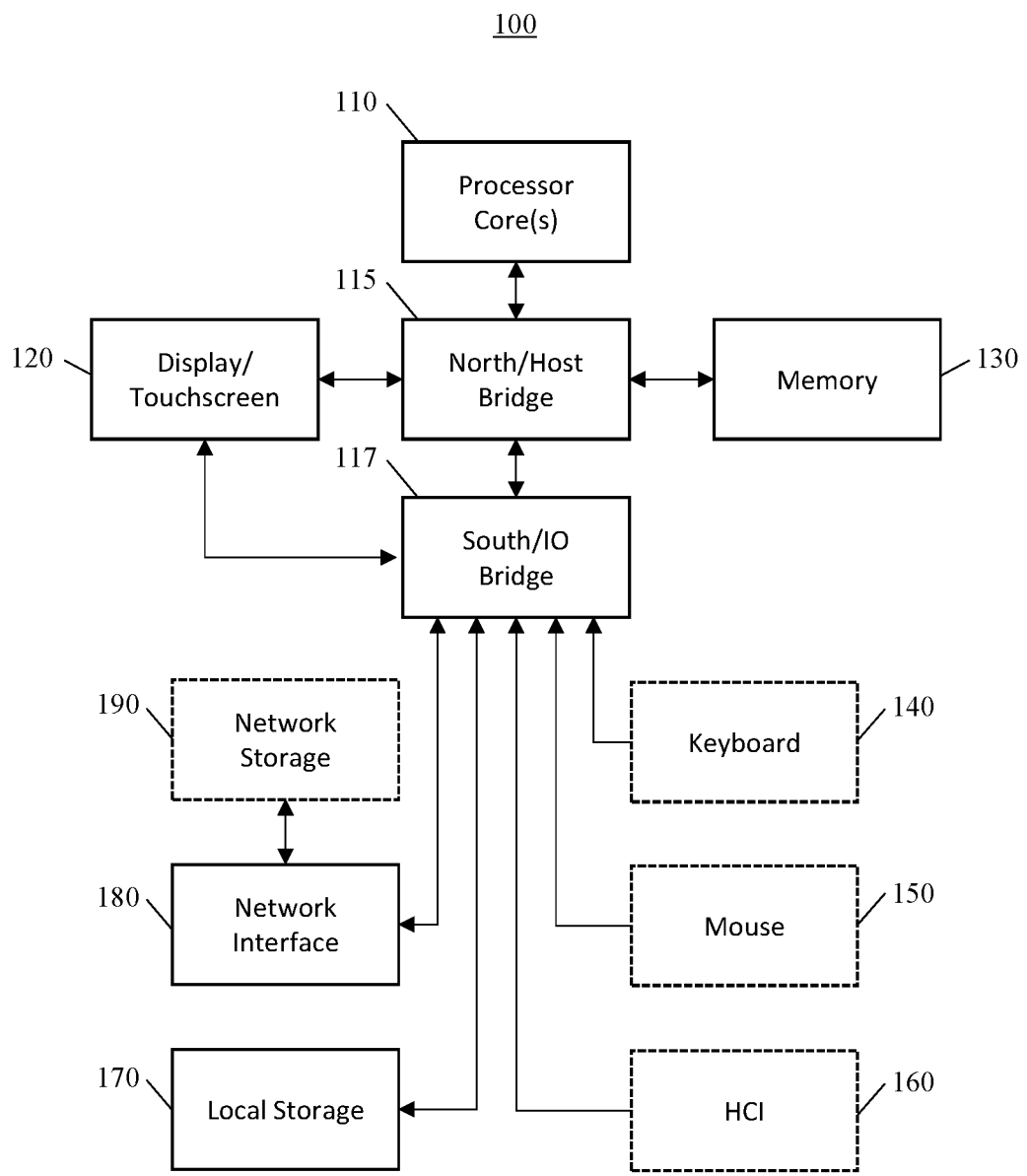
FIG. 1 shows a computing system for real-time broadcast audience engagement in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Conventionally, broadcast shows use one or more of surveys, ratings, call-in lines, and social media to measure audience engagement in an ex post facto manner. Surveys typically include posing a number of questions to a sample population and making statistical inferences from the survey responses regarding the wider broadcast audience. Surveys require audience members, such as listeners or viewers of content, to take a survey regarding the content they were provided, after having consumed it. The survey responses are aggregated and statistical analysis is performed to extrapolate the results of the survey from the sample population to the wider broadcast audience. The accuracy of surveys is complicated by the type of questions posed, the sample population, and the statistical analysis used. An inherent problem with surveys is that they are cumbersome, time consuming, and unappealing to large segments of the broadcast audience, which typically skews the sample population in a way that makes it difficult to extrapolate the results of the survey to the wider broadcast audience. Moreover, survey results are not provided in real-time and fail to provide a broadcaster with meaningful metrics of broadcast audience engagement for a given show while the show is currently being broadcast.

Ratings typically require surveys, passive sampling, or active sampling of audience member's content consumption. When ratings are calculated based on surveys, ratings suffer the same issues as noted above with respect to surveys. When ratings are calculated based on sampling, they are complicated by methodological challenges, the sample population, and the statistical analysis used to extrapolate the results of the survey from the sample population to the wider broadcast audience. An inherent problem with ratings is the complex manner in which content is now consumed. Consequently, the statistical analysis is more complicated, less reliable, and it is more difficult to draw actionable inferences from the analysis. For example, a ratings system focused on, for example, analog broadcast fails to consider digital broadcast, internet broadcast, and other means of broadcasting and inherently skews the statistical inferences that may be drawn from the sample population. Even when ratings attempt to sample all means of broadcasting, it is difficult to construct an accurate sample population to gauge the views of the wider broadcast audience. Moreover, because of the complication in sampling, analyzing, and drawing inferences, ratings are typically provided to a broadcaster at fixed intervals of days, weeks, or months, after the broadcast has already concluded. As such, ratings are not provided in real-time and fail to provide a broadcaster with meaningful metrics of broadcast audience engagement for a given show while the show is currently being broadcast.

Prior to social media, call-in lines were the only means by which a broadcaster could get a feel for the audience's reaction while broadcasting. However, call-in lines are substantially limited as a metric of real-time broadcast audience engagement. Typically, a broadcast show only has a small number of call-in lines available for such use. A screener for the call-in lines will receive the calls, screen the callers to determine if they will be put through to the host, and then the callers are placed on hold until the host gets to a particular caller, if the host gets to the caller at all. Once the number of incoming calls exceeds the number of call-in lines, no further calls may be received. As such, call-in lines represent an artificially small sample size and there is no way to know whether ten people attempted to call in or a thousand. While artificially small, the sample is also highly skewed in ways that make it difficult to draw meaningful inferences. The call-in process is cumbersome, time consuming, and expensive as it requires dedicated human resources from the broadcast show. It is not unusual for a caller to be placed on hold for thirty minutes or more, often to not even be put through to the show's host. As such, the type of listener or viewer willing to endure the call-in process typically has strong opinions or a strong desire to share opinions and may not represent the true demographics of the broadcast show's audience. In the event a caller is put on the air with the broadcaster, it often does not make for good broadcasting as some callers have stage fright or difficulty communicating their views, which negatively impacts audience engagement. Moreover, because the caller is typically identified, either by name, image, or voice, many callers are reluctant to share their true opinions if they feel their views will be poorly received or expose them to the judgement or condemnation of others. As such, call-in lines fail to provide a broadcaster with meaningful metrics of broadcast audience engagement for a given show while the show is currently being broadcast.

Social media includes various platforms that facilitate social engagement via the internet such as, for example, Twitter®, Facebook®, Instagram®, Snapchat®, and others. While many broadcast shows maintain a presence on various social media platforms, they too are substantially limited as a metric of real-time broadcast audience engagement. Social media requires an audience member to identify and navigate to the profile, or tag a username, of a broadcast show on a social media platform, which can be time consuming and cumbersome. Once the audience member is in a position to interact, the moment that they wished to comment on may have already passed. Even if the audience member is able to interact, their engagement may consist of ideograms, such as emojis, text, audio, or video and may require human interpretation and intervention. As such, it is difficult for a broadcaster to identify and tabulate the social media engagement in a meaningful way. This is further complicated by the fact that, because of the lag time between the comment being made, interpreted, and tabulated, the topic at hand may have changed a number of times. As such, it is difficult, if not impossible, to gauge how the engagement relates to the current topic at hand. Similar to call-in lines, the lack of anonymity and the fear of the judgement and condemnation of others also skew the nature of the engagement. As such, attempting to measure engagement through social media is time consuming, costly, requires substantial human intervention, and is of questionable reliability. Thus, social media engagement also fails to provide a broadcaster with meaningful metrics of broadcast audience engagement for a given show while the show is being broadcast.

Because these conventional metrics of broadcast audience engagement are cumbersome, they typically only appeal to a small segment of very engaged and motivated audience members who may not be representative of the wider broadcast audience. Moreover, because these conventional metrics lack immediacy, they are of limited value to a broadcaster of a given show while the show is currently being broadcast. As such, a broadcaster has no way of knowing whether a topic they are currently discussing is of interest to their audience or whether the topic is causing their audience to lose interest and change the proverbial channel.

Accordingly, in one or more embodiments of the present invention, a method and system for real-time broadcast audience engagement provides broadcasters with real-time metrics of broadcast audience engagement for a given show while the show is being broadcast. These real-time metrics of broadcast audience engagement may be used by the broadcaster to adjust the content of their program or show in a manner that improves engagement and listenership or viewership while they are broadcasting. For example, a broadcaster may determine that a topic or line of discussion is of great interest to the broadcast audience and continue the discussion or explore the topic further. Similarly, the broadcaster may determine that the topic or line of discussion is of little to no interest to the broadcast audience and may move on to another topic of potentially more interest. While many audience members have a desire to engage with a broadcaster or broadcast show, conventional methods of audience engagement are cumbersome, lack immediacy, and are typically not anonymous.

Advantageously, the method and system for real-time broadcast audience engagement is simple, real-time, and anonymous. As such, a substantially larger segment of the broadcast audience may interact with the broadcast show while it is being broadcast. Broadcasters may monitor and track broadcast audience engagement in real-time and immediately respond to maintain or improve audience engagement. In addition, the method and system for real-time broadcast audience engagement may be used to ascertain the audience interest in a particular caller or guest in a similar manner. For the purpose of this disclosure, the term real-time means in the amount of time required for an audience member's reaction to be lodged, tabulated, and communicated with the broadcast show, but such lag is expected to be on the order of mere seconds and is approximately real-time for the purpose of broadcast audience engagement. One of ordinary skill in the art will recognize that the method and system for real-time broadcast audience engagement may be used with radio, television, or any other type of broadcast show that is broadcast live in accordance with one or more embodiments of the present invention.

FIG. 1 shows a computing system for real-time broadcast audience engagement 100 in accordance with one or more embodiments of the present invention. Computing system 100 may include one or more processor cores 110 disposed on one or more printed circuit boards (not shown). Each of the one or more processor cores 110 may be a single-core processor (not independently illustrated) or a multi-core processor (not independently illustrated). Multi-core processors typically include a plurality of processor cores disposed on the same physical die (not shown) or a plurality of processor cores disposed on multiple die (not shown) that are collectively disposed within the same mechanical package. Computing system 100 may also include various core logic components such as, for example, a north, or host, bridge device 115 and a south, or input/output ("IO"), bridge device 117. North bridge 115 may include one or more processor interface(s), memory interface(s), graphics interface(s), high speed IO interface(s) (not shown), and south bridge interface(s). South bridge 117 may include one or more IO interface(s). One of ordinary skill in the art will recognize that the one or more processor cores 110, north bridge 115, and south bridge 117, or various subsets or combinations of functions or features thereof, may be integrated, in whole or in part, or distributed among various discrete devices in a way that may vary based on an application, design, or form factor in accordance with one or more embodiments of the present invention.

Computing system 100 may include one or more IO devices such as, for example, a display device 120, system memory 130, optional keyboard 140, optional mouse 150, and/or an optional human-computer interface 160. Depending on the application or design of computing system 100, the one or more IO devices may or may not be integrated. Display device 120 may be a touch screen that includes a touch sensor (not independently illustrated) configured to sense touch. For example, a user may interact directly with objects depicted on display device 120 by touch or gestures that are sensed by the touch sensor and treated as input by computing system 100.

Computing system 100 may include one or more local storage devices 170. Local storage device 170 may be a solid-state memory device, a solid-state memory device array, a hard disk drive, a hard disk drive array, or any other non-transitory computer readable medium. Computing system 100 may include one or more network interface devices 180 that provide one or more network interfaces. The network interface may be Ethernet, Wi-Fi, Bluetooth, WiMAX, Fibre Channel, or any other network interface suitable to facilitate networked communications.

Computing system 100 may include one or more network-attached storage devices 190 in addition to, or instead of, one or more local storage devices 170. Network-attached storage device 190 may be a solid-state memory device, a solid-state memory device array, a hard disk drive, a hard disk drive array, or any other non-transitory computer readable medium. Network-attached storage device 190 may or may not be collocated with computing system 100 and may be accessible to computing system 100 via one or more network interfaces provided by one or more network interface devices 180.

One of ordinary skill in the art will recognize that computing system 100 may be a cloud-based server, a server, a workstation, a desktop, a laptop, a netbook, a tablet, a smartphone, a mobile device, and/or any other type of computing system in accordance with one or more embodiments of the present invention.

Figure 2:
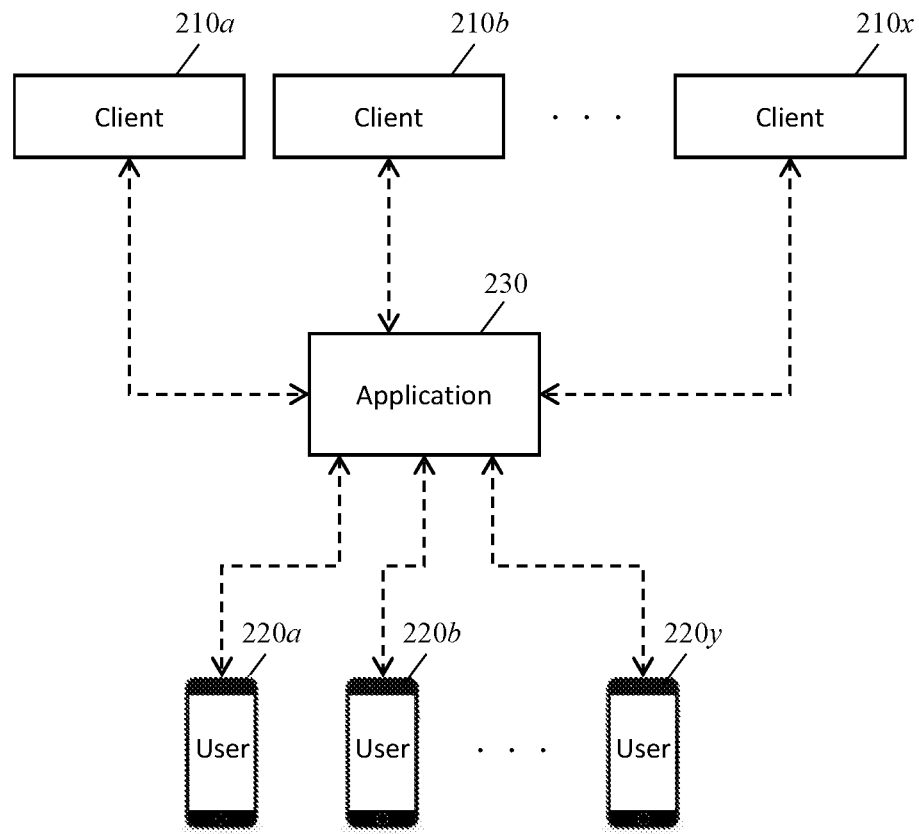
FIG. 2 shows a system for real-time broadcast audience engagement in accordance with one or more embodiments of the present invention.

FIG. 2 shows a system for real-time broadcast audience engagement 200 in accordance with one or more embodiments of the present invention. A system for real-time broadcast audience engagement 200 may include one or more application servers 230 configured to execute an application-side software application for real-time broadcast engagement, one or more client computing systems 210 configured to execute a client-side software application for real-time broadcast engagement, and a plurality of audience member's, or user's, computing systems 220 configured to execute a user-side software application for real-time broadcast engagement. One of ordinary skill in the art will recognize that the one or more application servers 300, the one or more client computing systems 210, and the plurality of user computing systems 220 may be computing systems (100 of FIG. 1) that may vary in form factor and feature set. For example, in one or more embodiments of the present invention, an application server 230 may be a server, a workstation, a desktop, or a laptop computing system (100 of FIG. 1), while a client computing system 210 may be a server, a workstation, a desktop, a laptop, or a tablet computing system (100 of FIG. 1), and a user computing system 220 may be a desktop, a laptop, a netbook, a tablet, a smartphone, a mobile device, or any other type or kind of personal computing system (100 of FIG. 1). The one or more client computing systems 210 may communicate with one or more application servers 230 via a network interface. Similarly, the plurality of user computing systems 220 may communicate with application server 230 via a network interface. For example, the one or more client computing systems 210 and the plurality of user computing systems 220 may exchange data with application server 230 over an internet or networked connection.

In certain embodiments, a system for real-time broadcast audience engagement 200 may include a virtual server 230 configured to execute the application-side software application for real-time broadcast audience engagement application (305 of FIG. 3) that may be instantiated in a cloud-based server (100 of FIG. 1) such as those provided by, for example, Amazon AWS®, Microsoft Azure®, Google Cloud®, and other cloud computing service providers. In such embodiments, the components of virtual server 230 may be distributed in a manner that is transparent, but potentially unknown, to the end user. Advantageously, cloud-based servers (100 of FIG. 1) typically provide physical isolation, fault tolerance, redundancy, and automated backup mechanisms that protect the integrity of data stored therein. In other embodiments, a system for real-time broadcast audience engagement 200 may include a physical server 230 configured to execute a real-time broadcast audience engagement application (305 of FIG. 3) that may be hosted by a third party. In still other embodiments, a system for real-time broadcast audience engagement 200 may include a physical server 230 configured to execute a real-time broadcast audience engagement application (305 of FIG. 3) that may be hosted internally within an organization. One of ordinary skill in the art will recognize that other types and combinations of computing systems (100 of FIG. 1) may be used on the application-side, client-side, or user-side in accordance with one or more embodiments of the present invention.

Figure 3:
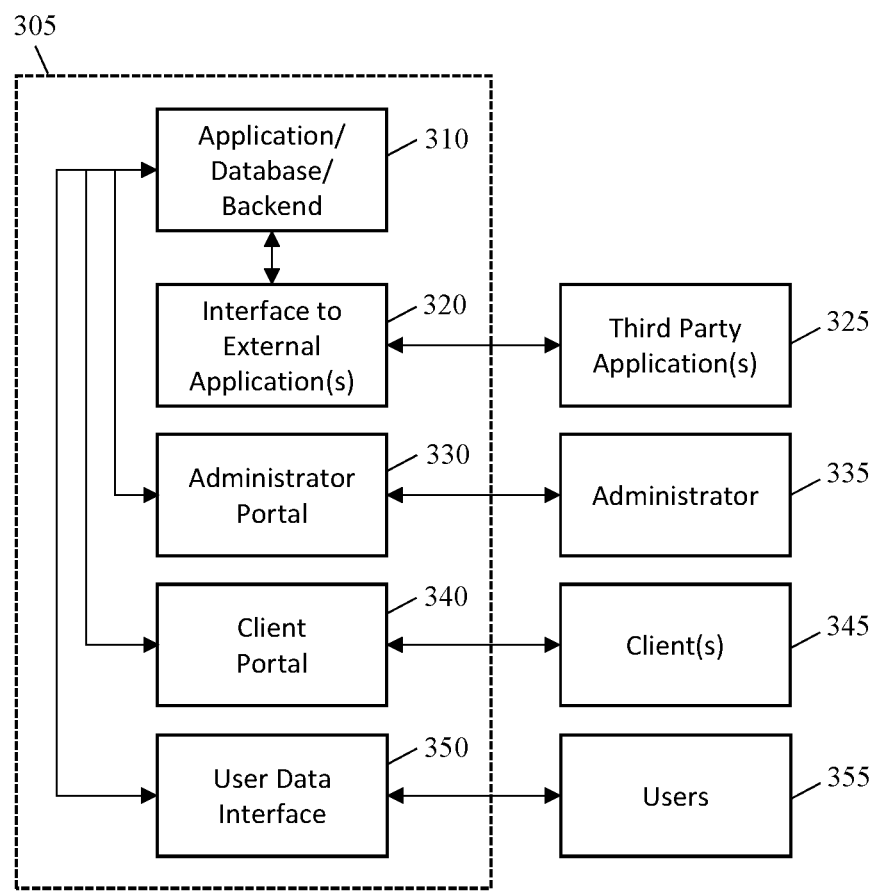
FIG. 3 shows a block diagram of a software architecture for real-time broadcast audience engagement in accordance with one or more embodiments of the present invention.

FIG. 3 shows a block diagram of a software architecture for real-time broadcast audience engagement 300 in accordance with one or more embodiments of the present invention. An application-side software application for real-time broadcast audience engagement 305 may be configured to execute on an application server (230 of FIG. 2) and perform, in whole or in part, a method of real-time broadcast audience engagement (600 of FIG. 6). One or more clients (210 of FIG. 2), such as a broadcast show client, may interface with the application-side software application 305 by way of a client portal 340 accessed via a stand-alone software application or web-based portal 345 executing on a client-side computing system (220 of FIG. 2). A plurality of users (220 of FIG. 2), such as listeners or viewers of a broadcast show, may interface with the application-side software application 305 by way of a user data interface 350 accessed via a stand-alone software application or web-based portal 355 executing on a user-side computing system (220 of FIG. 2), but typically a smartphone, tablet, or other mobile device.

Application-side software application for real-time broadcast engagement 305 may include an application/database/backend portion 310, an interface to external applications 320, an administrator portal 330, a client portal 340, a user data interface 350, and any other portions or modules required to instantiate the application 305. Application/database/backend portion 310 may, for example, perform, in whole or in part, the method of real-time broadcast engagement (600 of FIG. 6), coordinate and exchange data with various modules of application 305, coordinate and exchange data with one or more external applications 320 and portals, including one or more administrator portals 330, client portals 340, and user data interfaces 350, and maintain an internal database used to store data.

An interface to external applications 320 may provide an interface to one or more external or third-party software applications 325, which may optionally be used. For example, in certain embodiments, a third-party statistics application may be used to prepare or analyze statistics as part of providing the metrics of real-time broadcast audience engagement. One of ordinary skill in the art will recognize that any external application 325 that is configured to use data from, work collaboratively with, or provide data to application 305 may be used in accordance with one or more embodiments of the present invention.

An administrator portal 330 may provide one or more administrators (not independently illustrated) access 335 to configure, maintain, and manage software application 305. An administrator (not independently illustrated) may access administrator portal 330 via the computing system (100 of FIG. 1) on which application-side software application 305 is executing or by way of a stand-alone software application or web-based portal 335 executing on another computing system (100 of FIG. 1). Configuration may include setting up client accounts, establishing rights and privileges, and configuring any other options or settings relevant to the configuration of application-side software application 305.

A client portal 340 may provide one or more clients (not independently illustrated) access to configure, maintain, and manage their account and receive metrics of real-time broadcast audience engagement as discussed in more detail with respect to FIGS. 5A through 5E and 6. Each client (not independently illustrated) may access client portal 340 via a stand-alone client-side software application or web-based portal 345 for real-time broadcast audience engagement executing on their computing system (100 of FIG. 1). Configuration may include configuring preferences, poll questions and answers, advertisements, advertisement options, advertisement rotations, metrics reporting, and other options and settings relevant to the configuration of client-side software application 345.

A user data interface 350 may provide an interface for the exchange of data with a plurality of users (not independently illustrated) who are each executing, for example, a stand-alone user-side software application or web-based portal 355 for real-time broadcast audience engagement as discussed in more detail with respect to FIGS. 4A through 4G and 6. One of ordinary skill in the art will recognize that various aspects of application-side software application 305, client-side software application 345, and user-side software application 355 and the functions that they implement may be vary and may be distributed in different ways based on an application or design in accordance with one or more embodiments of the present invention.

Figure 4A:
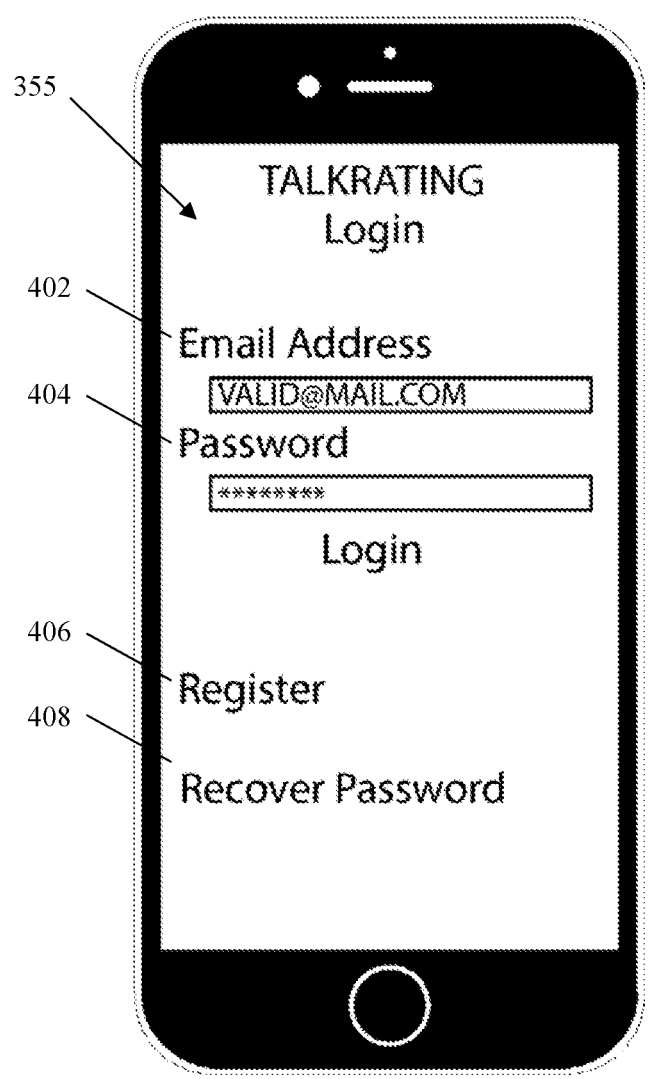
FIG. 4A shows a login interface of a user-side software application for real-time broadcast audience engagement in accordance with one or more embodiments of the present invention.

FIG. 4A shows a login interface of a user-side software application 355 for real-time broadcast audience engagement in accordance with one or more embodiments of the present invention. User-side software application 355 may be a stand-alone software application or web-based portal executed on, for example, a user's smartphone (220 of FIG. 2). User-side software application 355 may be configured to exchange data with an application-side software application (305 of FIG. 3) for real-time broadcast audience engagement. In certain embodiments, a user (not shown) may be able to use user-side software application 355 without providing any login credentials to maintain their anonymity (not shown). In such embodiments, certain functionality of the user-side software application 355 may be limited. In other embodiments, a user (not shown) may be able to login with a username or email address 402 and password 404. The login credentials 402 and 404 may be passed over a network connection (not shown) to the application-side software application for real-time broadcast audience engagement (305 of FIG. 3) via a user data interface (350 of FIG. 3). The login credentials 402 and 404 may be stored in a database (310 of FIG. 3) of the application-side software application (305 of FIG. 3) to validate login credentials. In embodiments that use login credentials, user-side software application 355 may allow a new user to register a username or email address 402 and password 404 or recover 408 a forgotten password 404 from the application-side software application (305 of FIG. 3).

Figure 4B:
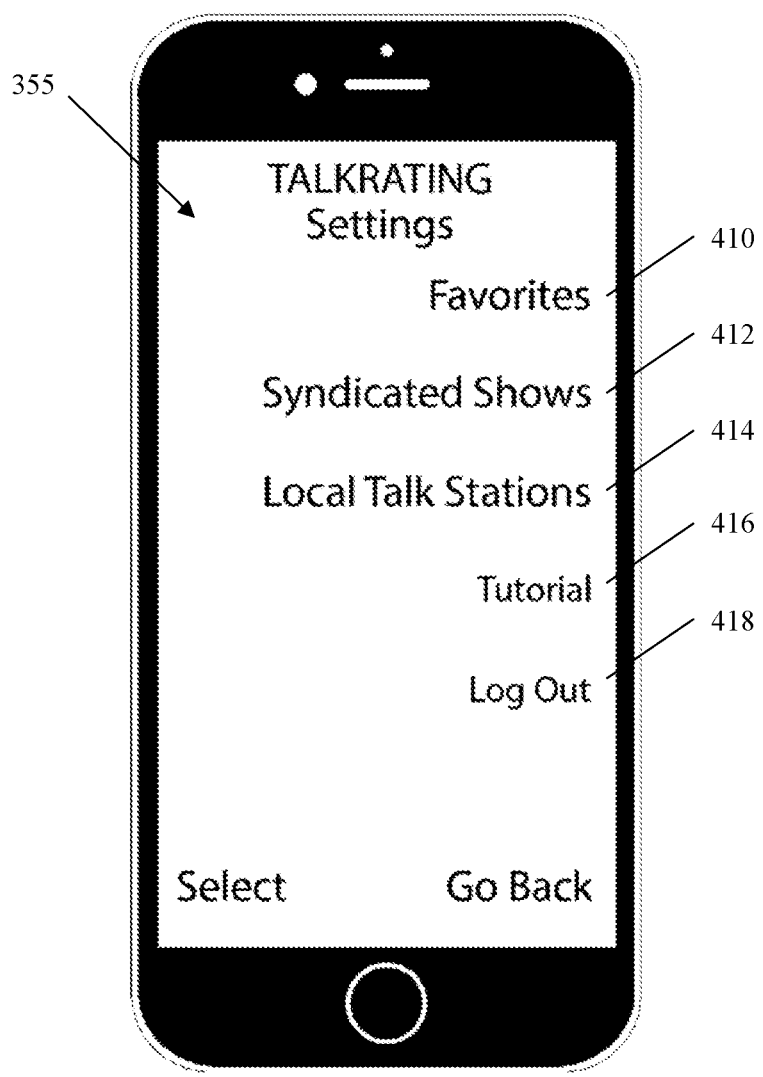
FIG. 4B shows a settings interface of a user-side software application for real-time broadcast audience engagement in accordance with one or more embodiments of the present invention.

Continuing, FIG. 4B shows a settings interface of a user-side software application 355 for real-time broadcast audience engagement in accordance with one or more embodiments of the present invention. The settings interface may be the initially displayed, or home, screen or accessed by touching or clicking on an icon (not shown) displayed on a display device of the user's computing system 220. The settings interface may include one or more of favorites 410, syndicated shows 412, local talk shows 414, a tutorial 416, a logout 418, and any other type or kind of options or settings relevant to such use. Favorites 410 may include a list of those broadcast shows that are currently being broadcast that the user has previously interacted with or indicated to be a favorite, which may include radio, television, or other types of broadcast shows. Syndicated shows 412 may include a list of syndicated shows that are currently being broadcast, which may include radio, television, or other types of broadcast shows. Local talk shows 414 may include a list of local talk shows that are currently being broadcast in the user's area as determined by a user provided location or a geolocation determined by the location of the user's computing system 220, which may also include radio, television, or other types of broadcast shows. Optionally, a tutorial 416 may be included that provides a tutorial on how to use application 355. Optionally, in embodiments that use login credentials, a logout 418 may be included that allows a user to securely logout of application 355.

Figure 4C:
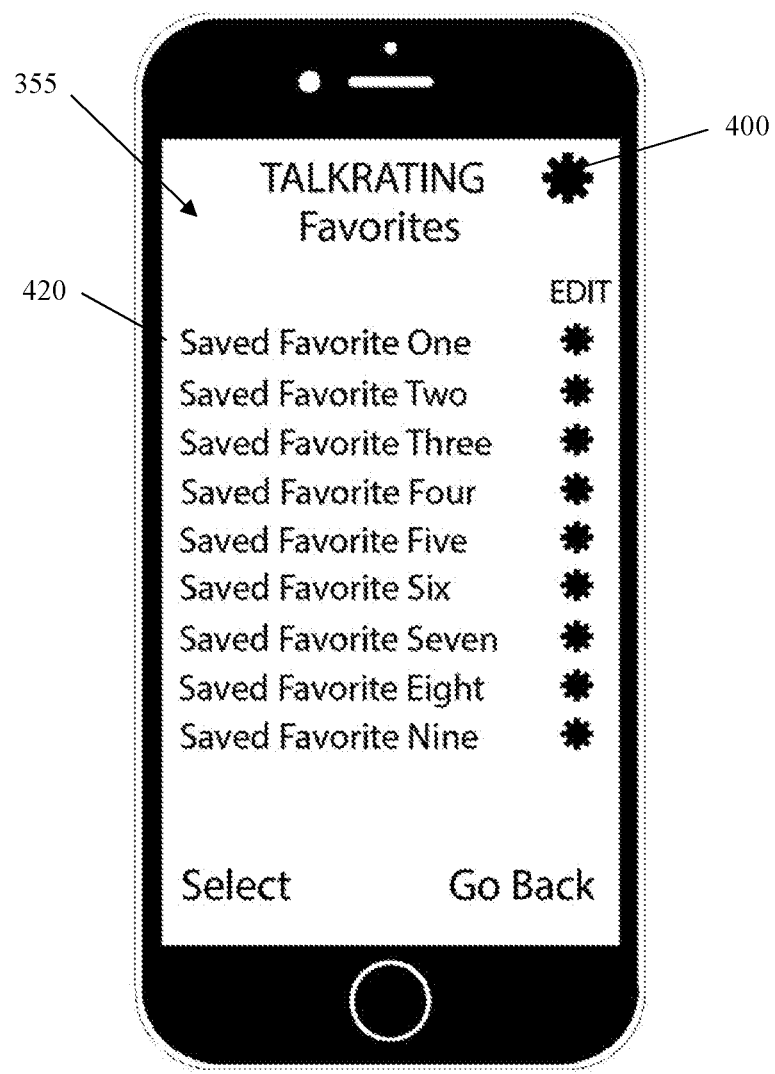
FIG. 4C shows a favorites interface of a user-side software application for real-time broadcast audience engagement in accordance with one or more embodiments of the present invention.

Continuing, FIG. 4C shows a favorites interface of a user-side software application 355 for real-time broadcast audience engagement in accordance with one or more embodiments of the present invention. On the favorites interface (accessed via 410 of FIG. 4B), one or more favorite broadcast shows 420, which are currently being broadcast, may be displayed for quick and easy access to the corresponding binary reaction interface (not shown) by a returning user. The user's favorites may be stored locally on their computing system 220 or provided to the user-side software application 355 by the application side software application (305 of FIG. 3) via a network interface (not shown) and hashed with a list of broadcast shows that are currently being broadcast live. The list of broadcast shows currently being broadcast live may be determined locally by the user-side software application 355 via its network interface (not shown) or provided to the user-side software application 355 by the application-side software application (305 of FIG. 3) via a network interface (not shown). A user may return to their initial, or home, screen by touching or clicking on icon 400.

Figure 4D:
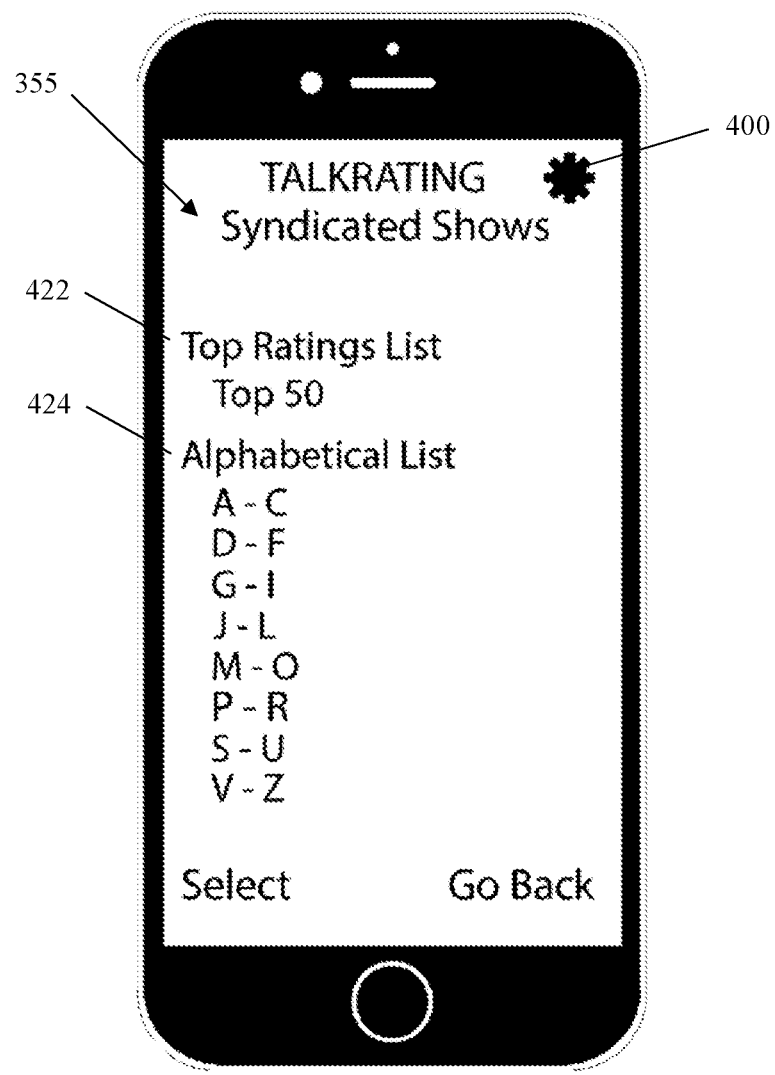
FIG. 4D shows a syndicated shows interface of a user-side software application for real-time broadcast audience engagement in accordance with one or more embodiments of the present invention.

Continuing, FIG. 4D shows a syndicated shows interface of a user-side software application 355 for real-time broadcast audience engagement in accordance with one or more embodiments of the present invention. On the syndicated shows interface (accessed via 412 of FIG. 4B), one or more syndicated shows (not shown), which are currently being broadcast, may be displayed for quick and easy access to the corresponding binary reaction interface (not shown) by a user. In certain embodiments, a list of top rated syndicated shows 422 may be provided. In other embodiments, an alphabetical list of syndicated shows 424 may also be included. The list of syndicated shows, top rated syndicated shows, or alphabetical list of syndicated shows currently being broadcast live may be determined locally by the user-side software application 355 via its network interface (not shown) or provided to the user-side software application 355 by the application-side software application (305 of FIG. 3) via a network interface (not shown). A user may return to their initial, or home, screen by touching or clicking on icon 400.

Figure 4E:
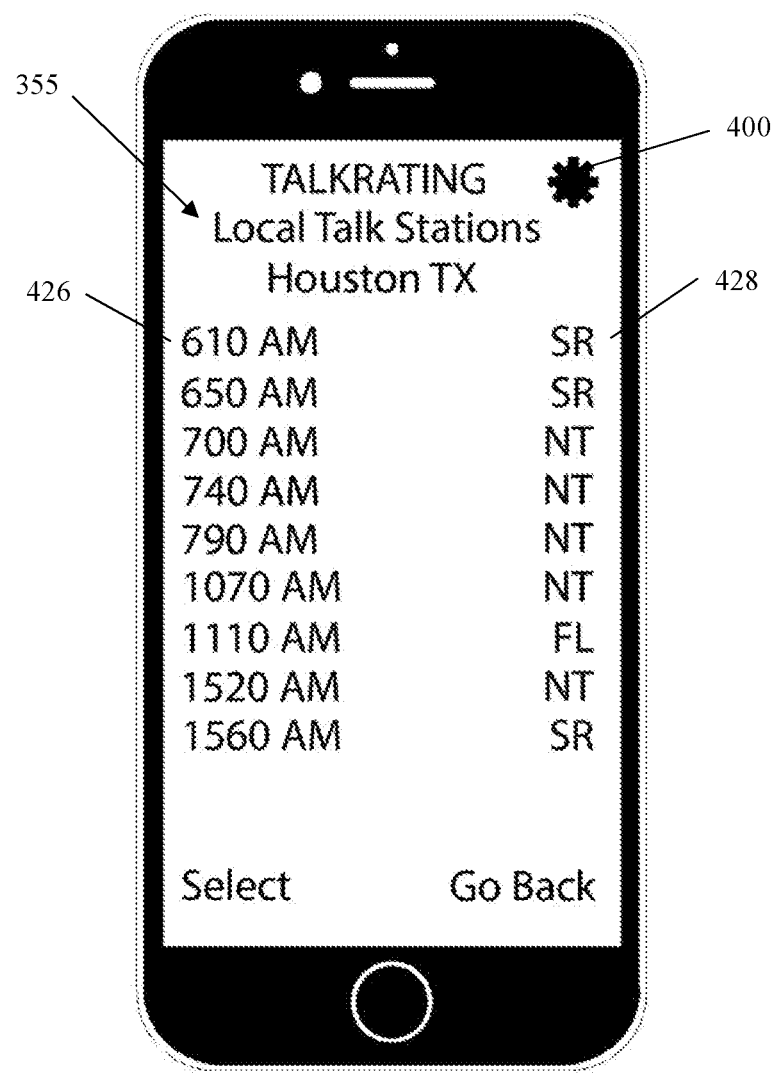
FIG. 4E shows a local talk shows interface of a user-side software application for real-time broadcast audience engagement in accordance with one or more embodiments of the present invention.

Continuing, FIG. 4E shows a local talk shows interface of a user-side software application 355 for real-time broadcast audience engagement in accordance with one or more embodiments of the present invention. On the local talk shows interface (accessed via 414 of FIG. 4B), one or more local talk shows 426, which are currently being broadcast, may be displayed for quick and easy access to the corresponding binary reaction interface (not shown) by a user. The list of local talk shows currently being broadcast live may be determined locally by the user-side software application 355 via its network interface (not shown) or provided to the user-side software application 355 by the application-side software application (305 of FIG. 3) via a network interface (not shown). In certain embodiments, an indication 428 of whether a broadcast show is a sports talk program ("SR"), a news talk program ("NT"), a financial/legal talk program ("FL"), or other type of program may be included to facilitate a user finding a broadcast show of interest. A user may return to their initial, or home, screen by touching or clicking on icon 400.

Figure 4F:
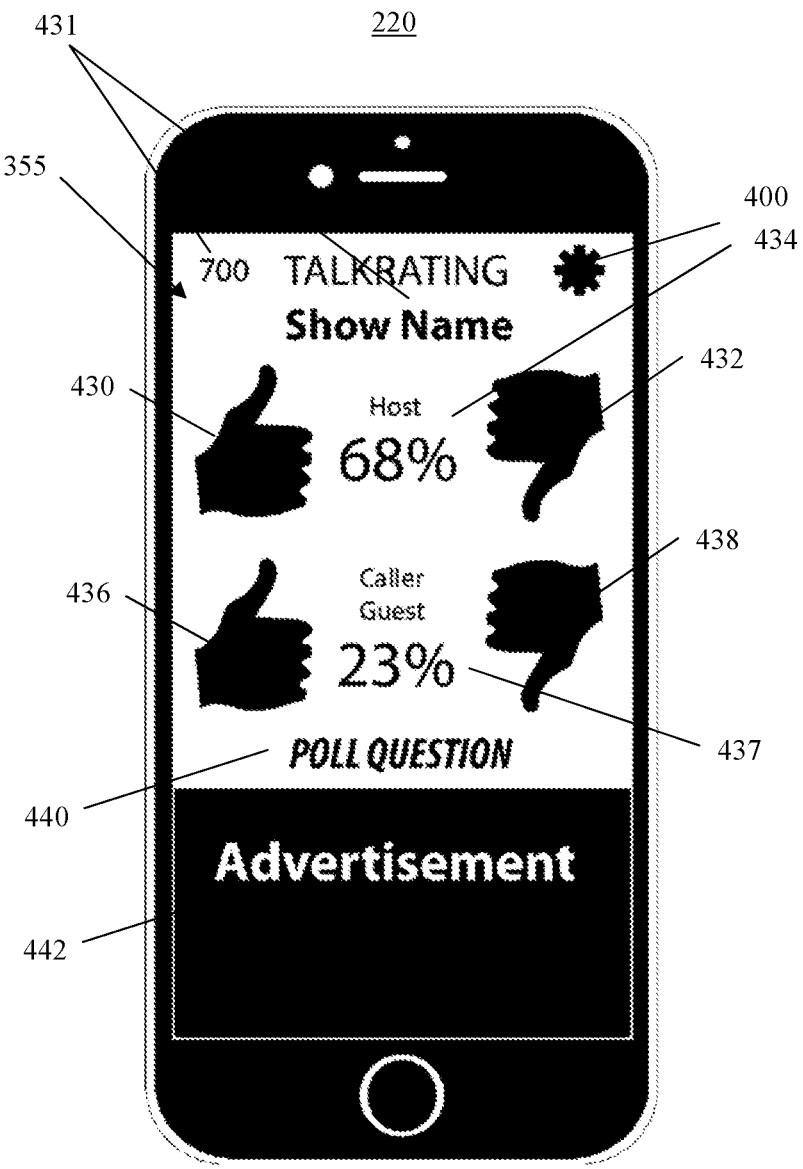
FIG. 4F shows a binary reaction interface of a user-side software application for real-time broadcast audience engagement in accordance with one or more embodiments of the present invention.

Continuing, FIG. 4F shows a binary reaction interface of a user-side software application 355 for real-time broadcast audience engagement in accordance with one or more embodiments of the present invention. As discussed above, a significant portion of a broadcast audience has a desire to engage with the broadcast show or broadcaster while a show is currently being broadcast. Conventional means of broadcast audience engagement are cumbersome and lack immediacy and tend to discourage and dramatically reduce the number of audience members who actually engage with the broadcast show or broadcaster. As such, a distinguishing aspect of the method and system for real-time broadcast audience engagement is the simplified, intuitive, and real-time manner in which audience members may engage with a broadcast show or broadcaster through a binary reaction interface while a show is currently being broadcast.

When a user selects a broadcast show that is currently being broadcast, the user-side software application 355 may display a simplified binary reaction interface that allows the user to lodge a reaction to the content they are currently listening to or viewing (potentially on another device). For purposes of monitoring, tracking, and reporting engagement, the audience member, or user, may lodge a positive reaction or a negative reaction to the content that is currently being broadcast. In certain embodiments, the binary reaction interface may include a visual depiction, such as an icon, corresponding to a positive reaction or a negative reaction. For example, a positive reaction to a broadcaster may be depicted by a "thumbs-up" icon (or other ideogram corresponding to a positive reaction) 430 and a negative reaction may be depicted by a "thumbs-down" icon (or other ideogram corresponding to a negative reaction) 432. While the user is listening to, or viewing, the content currently being broadcast, the user may simply touch or click on the positive reaction icon 430 or the negative reaction icon 432 to lodge their binary reaction. The user-side software application 355 may transmit this binary reaction to the application-side software application (305 of FIG. 3) via a network interface (not shown) for aggregation and reporting to one or more clients (210 of FIG. 2). User-side software application 355 may display one or more statistics 434, provided by the application-side software application (305 of FIG. 3), corresponding to, for example, the positive reaction percentage for the audience members currently participating in the real-time broadcast engagement application. In certain embodiments, the application-side software application (305 of FIG. 3) may restrict the interval by which the user's binary reaction may be received to prevent gaming of the statistic. One of ordinary skill in the art will recognize that the interval may vary based on an application or design. Optionally, one or more station, broadcast show, or broadcaster identifiers 431 may be displayed to confirm the broadcast show that the user is current engaging with through the user-side software application 355.

Optionally, user-side software application 355 may include an additional and potentially separate binary reaction interface for a caller or guest. While the user is listening to, or viewing, the content currently being broadcast, the user may simply touch or click on the positive reaction icon 436 or the negative reaction icon 438 to lodge their binary reaction. The user-side software application 355 may transmit this binary reaction to the application-side software application (305 of FIG. 3) via a network interface (not shown) for aggregation and reporting to one or more clients (210 of FIG. 2). User-side software application 355 may display one or more statistics 437, provided by the application-side software application (305 of FIG. 3), corresponding to, for example, the percentage of positive reactions for audience members currently participating in the real-time broadcast engagement application. In certain embodiments, the application-side software application (305 of FIG. 3) may restrict the interval by which the user's binary reaction may be received to prevent gaming of the statistic. One of ordinary skill in the art will recognize that the interval may vary based on an application or design.

Optionally, user-side software application 355 may reserve a portion of the display for an advertisement interface 442 that may include an advertisement for an advertiser of the broadcast show and pushed to the user-side software application 355 by the application-side software application (305 of FIG. 3). Advertisement interface 442 may include text, graphical, audio, or video content and may include a hyperlink or clickable content. The user-side software application 355 may transmit an indication that a user clicked on the hyperlink or clickable content to the application-side software application (305 of FIG. 3) via a network interface (not shown) for aggregation and reporting to one or more clients (210 of FIG. 2).

Figure 4G:
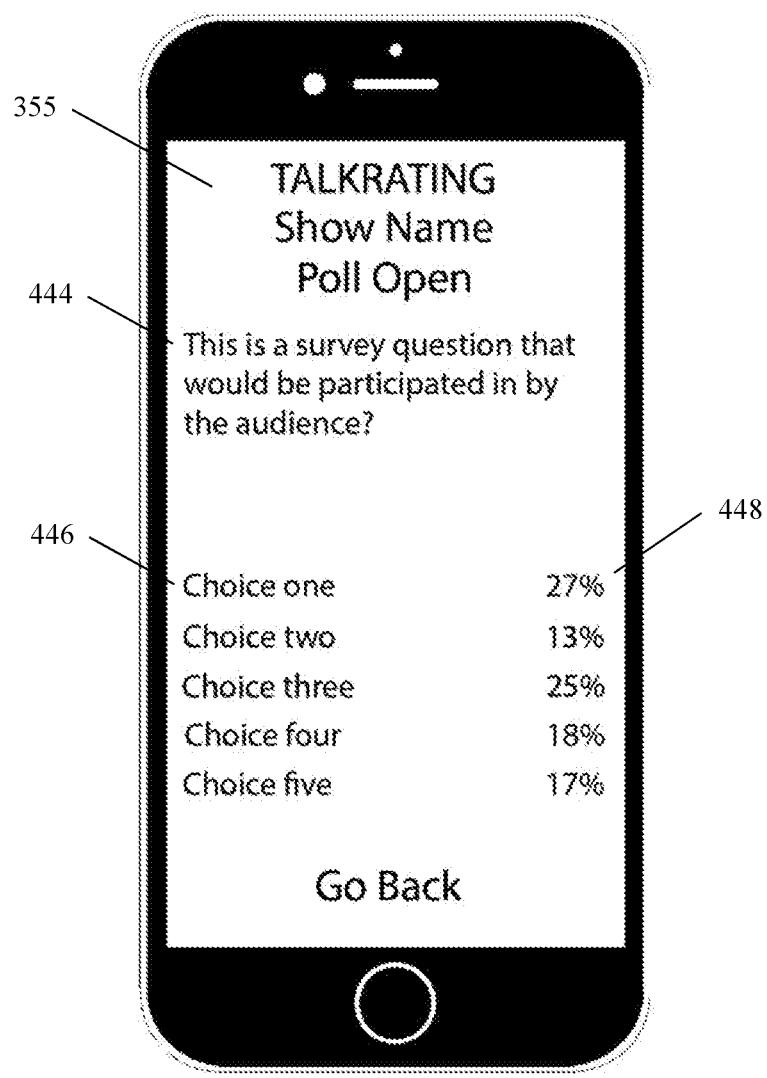
FIG. 4G shows a poll interface of a user-side software application for real-time broadcast audience engagement in accordance with one or more embodiments of the present invention.

Optionally, user-side software application 355 may reserve a portion of the display for a poll interface link 440 that will direct the user to a poll question posed by a client (broadcast show) that may be relevant to the content currently being broadcast (e.g., FIG. 4G). If the user wishes to participate, the user may simply touch or click on the poll interface link 440.

Continuing, FIG. 4G shows a poll interface of a user-side software application 355 for real-time broadcast audience engagement in accordance with one or more embodiments of the present invention. The poll interface may include a poll question 444 posed by a client (broadcast show) and a plurality of canned responses 446. If the user wishes to participate, the user may simply touch or click on the canned poll response 446 of their choice. The user-side software application 355 may transmit the poll response 446 to the application-side software application (305 of FIG. 3) via a network interface (not shown) for aggregation and reporting to one or more clients (210 of FIG. 2). User-side software application 355 may display one or more statistics 448, provided by the application-side software application (305 of FIG. 3), corresponding to, for example, the percentage of votes for each of the canned poll responses from audience members currently participating in the real-time broadcast engagement application once the user's poll response has been lodged.

Figure 5A:
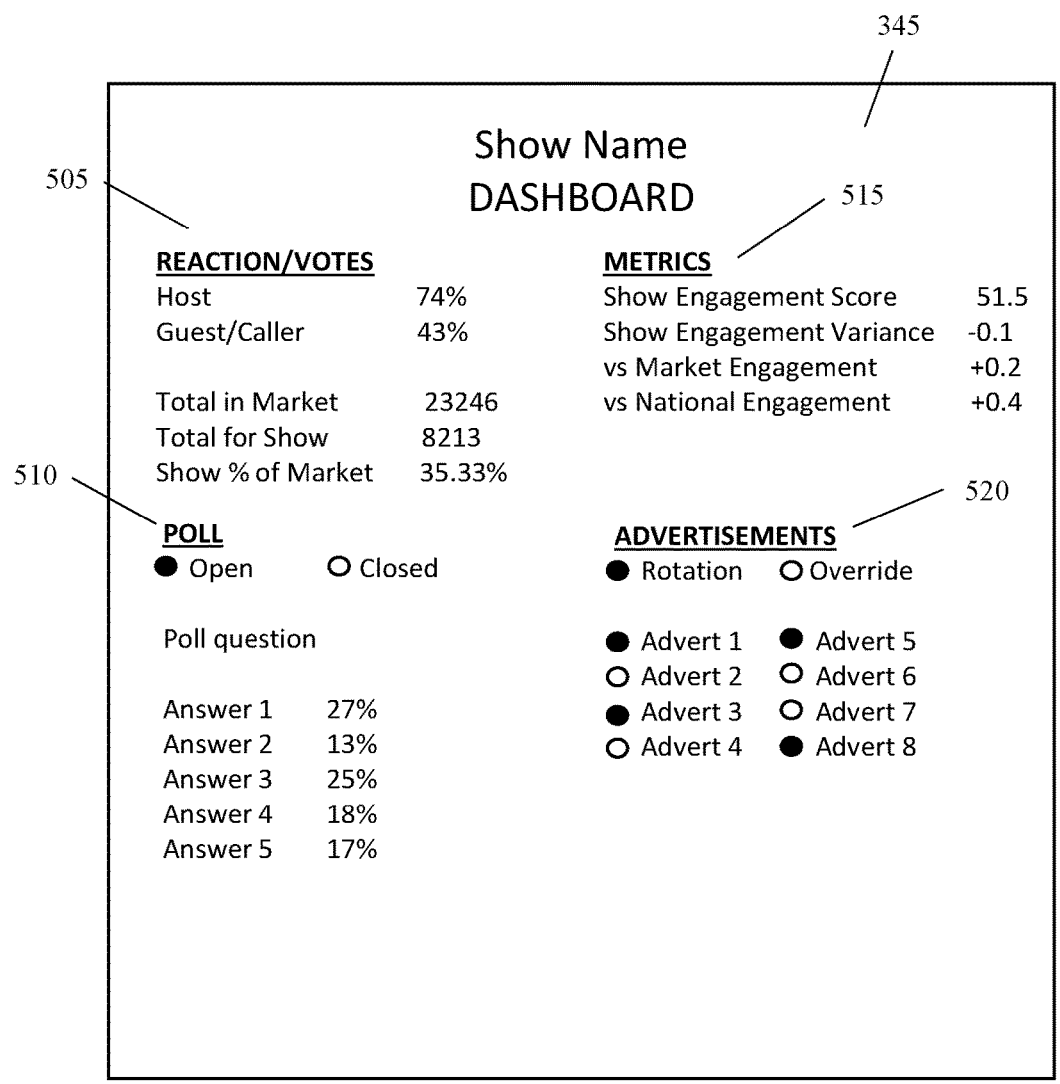
FIG. 5A shows a dashboard interface of a client-side software application for real-time broadcast audience engagement in accordance with one or more embodiments of the present invention.

FIG. 5A shows a dashboard interface of a client-side software application for real-time broadcast audience engagement 345 in accordance with one or more embodiments of the present invention. A client, such as a broadcast show, may log into the dashboard interface of the client-side software application for real-time broadcast audience engagement 345 on their computing device (100 of FIG. 1 & 210 of FIG. 2) and view various metrics of real-time broadcast audience engagement in real-time while their show is currently being broadcast. The application-side software application (305 of FIG. 3) may aggregate and share data with the client-side software application 345 via a network interface (not shown). The client-side software application 345 may include one or more of a reaction display 505, a poll display 510, a metrics display 515, and an advertisement display 520.

Reaction display 505 may show aggregated statistics for the broadcast show, broadcaster, or host, and optionally aggregated statistics for a caller or guest. The aggregated statistics may show a number of positive reactions and a number of negative reactions (not shown) or a percentage of, for example, positive reactions as a percentage, for all users participating in the real-time broadcast audience engagement for the selected show. The aggregated statistics may include a rolling average of positive reactions and a rolling average of negative reactions to ensure that the reactions are timely and relevant to the content currently being broadcast. In addition, the aggregated statistics may display a total number of audience members participating in the real-time broadcast audience engagement application for a given market, a total number of audience members participating in the real-time broadcast audience engagement application for their particular show, and their percentage of the market. Each of which may also be measured as a rolling average. One of ordinary skill in the art will recognize that other aggregated statistics may be used in accordance with one or more embodiments of the present invention. Poll display 510 may include an indication of whether a poll is open or closed and show a percentage of aggregated votes for each canned poll response. Poll display 510 may optionally include a choice to turn a poll question on or off that is pushed down to the user-side software applications 355 via the application-side software application (305 of FIG. 3).

Metrics display 515 may include one or more metrics of real-time broadcast audience engagement. In certain embodiments, the one or more metrics may include an engagement score, an engagement variance, a comparison-to-market engagement score, and a comparison-to-national engagement score. In certain embodiments, the engagement score may be calculated by dividing a total number of binary reactions, positive or negative, received from all participating users for the show currently being broadcast that are received within a predetermined period of time by a total number of audience members for the selected show, the resulting quantity multiplied by a normalization factor. One of ordinary skill in the art will recognize that the predetermined period of time may vary based on an application or design. One of ordinary skill in the art will recognize that other methods of calculating an engagement score may be used in accordance with one or more embodiments of the present invention. An engagement variance may be a statistical variance of the calculated engagement score. A comparison-to-market engagement score may be calculated by subtracting an average engagement for other shows in the same market from the calculated engagement score for the selected show of interest. Similarly, a comparison-to-national engagement score may be calculated by subtracting an average engagement score for other shows nationwide from the engagement score for the selected show of interest.

Advertisement display 520 may include an option to rotate through selected advertisements or an override that allows the broadcast show to select specific ads to run. In addition, the advertisement display may include a listing of advertisements and a selection interface for inclusion in the rotation or for the override. Once selected, the advertisements are pushed according to the clients instructions to the application-side software application (305 of FIG. 3) to the plurality of users engaging with the selected show via the user-side software application 355.

Continuing, FIG. 5B shows a metrics interface of a client-side software application for real-time broadcast audience engagement 345 in accordance with one or more embodiments of the present invention. The metrics interface may allow a client to run reports on historical metrics of real time broadcast audience engagement, such as positive reactions, negative reactions, percentage positive reactions, engagement scores, comparison-to-market engagement scores, and comparison-to-national engagement scores for a user-specified time interval 525. In addition, the client may select one or more individuals to receive the reports or email alerts regarding real time broadcast audience engagement 530. For example, in certain embodiments, the client may configure, through the client-side software application 345, the application-side software application (305 of FIG. 3) to send alert emails, text messages, or other messaging service to alert a broadcast show or broadcaster when a metric of real-time broadcast audience engagement meets, exceeds, or falls below a threshold value.

Figure 5D:
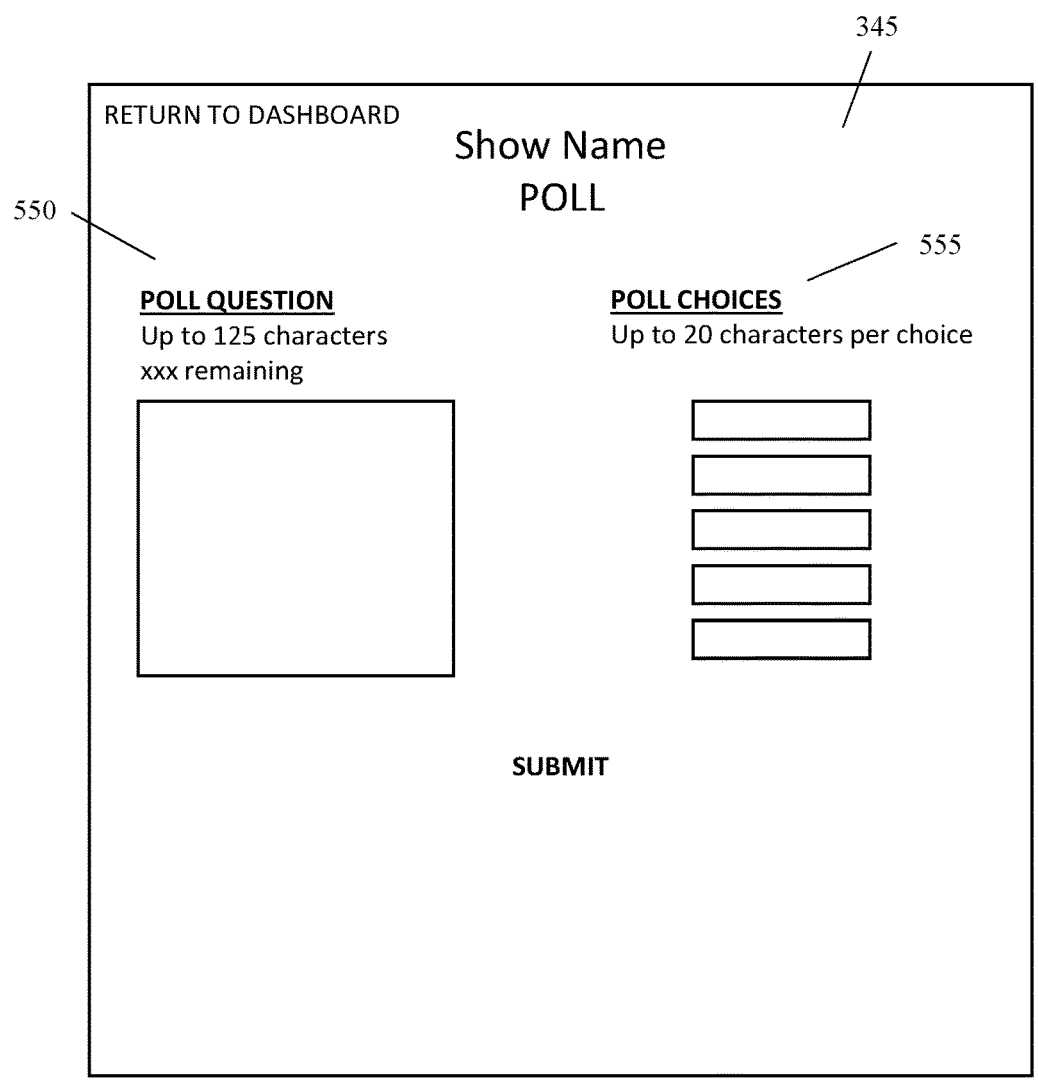
FIG. 5D shows a poll interface of a client-side software application for real-time broadcast audience engagement in accordance with one or more embodiments of the present invention.

Continuing, FIG. 5C shows a settings interface of a client-side software application for real-time broadcast audience engagement 345 in accordance with one or more embodiments of the present invention. The settings interface may allow a client to change one or more of their login credentials 535, such as, for example, a username (not shown), a password, a show name 540, a web address for the client show 545, or any other information or settings that may be relevant to such use. Continuing, FIG. 5D shows a poll interface of a client-side software application for real-time broadcast audience engagement 345 in accordance with one or more embodiments of the present invention. The poll interface may allow a client to enter a poll question and one or more canned poll responses that are relevant to, for example, content currently being broadcast. Once entered, the client-side software application 345 may transmit the poll question and one or more canned poll responses to the application-side software application (305 of FIG. 3), which in turn pushes the poll question and responses down to users currently engaging with the broadcast show via their user-side software application 355.

Continuing, FIG. 5E shows an advertiser interface of a client-side software application for real-time broadcast audience engagement 345 in accordance with one or more embodiments of the present invention. The advertiser interface may allow a client to create advertisements (not shown) for one or more advertisers (not shown) that are ultimately pushed to users. The advertiser interface may input one or more of identifying information 560 for a particular advertisement, advertisement verbiage 565, and advertisement graphics 570. Once entered, the client-side software application 345 may transmit the advertisement to the application-side software application (305 of FIG. 3), which in turn pushes the advertisement to users currently engaging with the broadcast show via their user-side software application 355, in accordance with the client's rotation or override (520 of FIG. 5A) selection entered via the client-side software application's dashboard interface (FIG. 5A).

Figure 6:
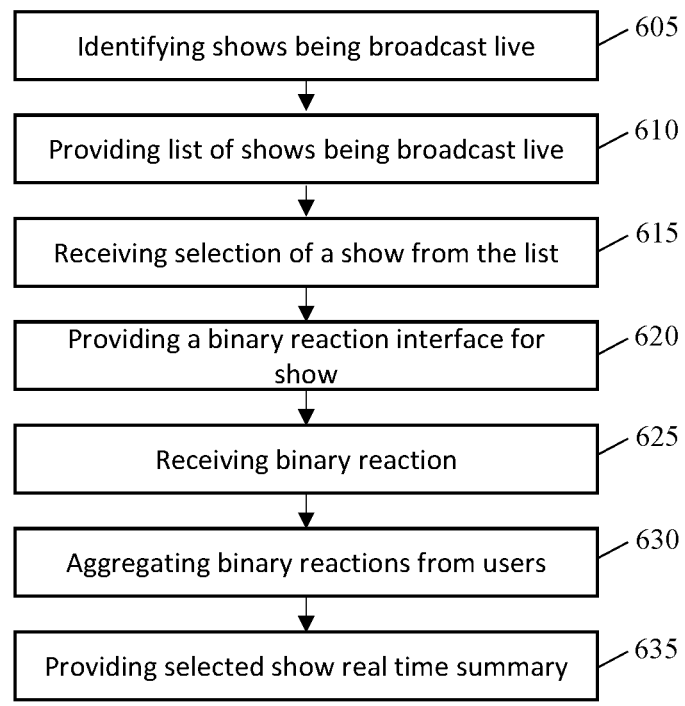
FIG. 6 shows a method of real-time broadcast audience engagement in accordance with one or more embodiments of the present invention.

FIG. 6 shows a method of real-time broadcast audience engagement 600 in accordance with one or more embodiments of the present invention.

As discussed above, a system for real-time broadcast audience engagement includes an application-side software application executing on one or more application computing systems, a client-side software application executing on one or more client's computing systems, and a user-side software application executing on a plurality of user's computing systems. The client-side software application and the user-side software application may be either stand alone software applications or web-based access to their respective portals of the application-side software application. The method of real-time broadcast audience engagement may be performed, in whole, or in part, by the application-side software application or the application-side software application in conjunction with the user-side software application. One of ordinary skill in the art will recognize that the application-side software application may work cooperatively with the client-side software application and the user-side software application (either stand alone or through web-based access to its portals). In addition, one of ordinary skill in the art will recognize that various functions performed by the application-side software application may be allocated to the client-side software application or the user-side software application based on an application or design in accordance with one or more embodiments of the present invention.

In step 605, a plurality of shows currently being broadcast live may be identified. In certain embodiments, the identification may be performed by the application-side software application for real-time broadcast audience engagement. In other embodiments, the identification may be performed by the user-side software application for real-time broadcast audience engagement. In either case, the identification comprises identifying one or more broadcast shows including local talk shows, terrestrial radio shows, satellite radio shows, terrestrial television shows, satellite television shows, cable television shows, syndicated shows, streaming shows, podcast shows, or web-based shows that are currently being broadcast live. While the means of broadcasting may introduce some measure of lag, one of ordinary skill in the art will recognize that the lag is on the order of mere seconds and a broadcast is substantially live when an audience member may consume the content at substantially the same time that the broadcaster is producing and providing the content. The broadcast shows may comprise audio and/or video content. The identification process may be performed by maintaining an itemized list of broadcast shows and the times and days that they broadcast live, maintaining a list of clients of the real-time broadcast audience engagement application, their shows, and the times and days that they broadcast live, or querying a database that maintains such information.

In step 610, a list of shows currently being broadcast live may be provided to an audience member. In certain embodiments, the list may be provided by the application-side software application for real-time broadcast audience engagement to a plurality of users via the user-side software application for real-time broadcast audience engagement. In other embodiments, the list may be provided by the user-side software application for real-time broadcast audience engagement.

In step 615, an audience member using the application for real-time broadcast audience engagement may peruse the list of broadcast shows currently being broadcast live and select a broadcast show to engage with via the user-side software application for real-time broadcast audience engagement.

In step 620, a binary reaction interface may be provided to an audience member. A binary reaction may correspond to a positive reaction or a negative reaction of an audience member. The binary reaction interface may be provided via the user-side software application for real-time broadcast audience engagement. However, various aspects of the binary reaction interface, such as, for example, a display of a rolling average of positive reactions, a rolling average of negative reactions, a rolling average of a percentage of positive reactions, a poll question, canned poll responses, and advertisements, may be pushed to the user-side software application for real-time broadcast audience engagement by the application-side software application for real-time broadcast audience engagement.

The user-side software application may display a simplified binary reaction interface that allows the audience member to lodge a reaction to the content they are currently listening to or viewing (potentially on another device from that on which they are consuming the content). For purposes of monitoring, tracking, and reporting engagement, the audience member, or user, may lodge a positive reaction or a negative reaction to the content that is currently being broadcast. In certain embodiments, the binary reaction interface may include a visual depiction, such as an icon, corresponding to a positive reaction or a negative reaction. For example, a positive reaction to a broadcaster may be depicted by a "thumbs-up" icon (or other ideogram corresponding to a positive reaction) and a negative reaction may be depicted by a "thumbs-down" icon (or other ideogram corresponding to a negative reaction). While the user is listening to, or viewing, the content currently being broadcast live, the user may simply touch or click on the positive reaction icon or the negative reaction icon to lodge their binary reaction. In certain embodiments, the application-side software application or user-side software application may restrict the interval by which the user's binary reaction may be received to prevent gaming of the statistic. One of ordinary skill in the art will recognize that the interval may vary based on an application or design.

In step 625, the audience member's binary reaction, based on the audience member's interaction with the binary reaction interface of the user-side software application for real-time broadcast audience engagement, may be received by the application-side software application for real-time broadcast audience engagement. The user-side software application may transmit this binary reaction to the application-side software application via a network interface for aggregation and reporting to one or more clients.

In step 630, a plurality of binary reactions from a plurality of audience members for the selected show that is being broadcast live, may be aggregated so that various metrics of real-time broadcast audience engagement may be calculated.

In step 635, a real-time summary of the plurality of binary reactions from the plurality of audience members may be provided to the client of the selected show (i.e., the broadcast show or broadcaster) to enable the broadcaster to make real-time adjustments to the content they are producing based on the real-time broadcast audience engagement metrics. In one or more embodiments of the present invention, the real-time summary may comprise one or more of a rolling average of positive reactions from the plurality of audience members for the selected show currently being broadcast live, a rolling average of negative reactions from the plurality of audience members for the selected show currently being broadcast live, and a percentage of positive reactions calculated from a rolling average of positive reactions and a rolling average of negative reactions from the plurality of audience members for the selected show currently being broadcast live.

In one or more embodiments of the present invention, the real-time summary may comprise one or more calculated metrics of real-time broadcast audience engagement. The calculated metrics of real-time broadcast audience engagement may include an audience engagement metric calculated by dividing a total number of binary reactions received for the selected show from the plurality of audience members for the selected show in a predetermined period of time by a total number of audience members for the selected show, the resulting quantity multiplied by a normalization factor. One of ordinary skill in the art will recognize that the predetermined period of time may vary based on an application or design. The calculated metrics of real-time broadcast audience engagement may include a comparison-to-market engagement score calculated by subtracting an average engagement score for other shows (not the selected one the audience member is engaging with) in the market for the selected show from the engagement score for the selected show. The calculated metrics of real-time broadcast audience engagement may include a comparison-to-national engagement score calculated by subtracting an average engagement score for other shows (not the selected one the audience member is engaging with) nationwide from the engagement score for the selected show.

In one or more embodiments of the present invention, the real-time summary of the plurality of binary reactions from the plurality of audience members may comprise one or more of a rolling average of an engagement score calculated for the selected show, a rolling average of a comparison-to-market engagement score, and a rolling average of a comparison-to-national engagement score. One of ordinary skill in the art will recognize that other metrics may be used in accordance with one or more embodiments of the present invention.

In certain embodiments, one or more of a real-time total number of active audience members in a market, a total number of active audience members for the selected show, and a percentage of active audience members for the selected show in the market may optionally be provided to the client, selected show. Active audience members include those audience members who are engaging with a show via the real-time broadcast audience engagement application.

In certain embodiments, the method may optionally provide the audience member with a poll interface. The client, or selected show, may, through the poll interface of the client-side software application, push a poll question and a plurality of canned responses to active audience members via the user-side software application. The application-side software application may receive the audience member's poll response based on the user's interaction with the poll interface. The application-side software application may aggregate the poll responses from the plurality of audience members for the selected show and provide the selected show a real-time summary of the plurality of poll responses received from the plurality of audience members.

In certain embodiments, the method may optionally provide the audience member with an advertisement interface. The client, or selected show, may, through the advertisement interface of the client-side software application, push an advertisement to active audience members via the user-side software application. The application-side software application may receive an indication of the audience member's interaction with an advertisement and provide the selected show a real-time summary of the interactions from the plurality of audience members.

One of ordinary skill in the art will recognize that a non-transitory computer readable medium comprising software instructions that, when executed by a processor, may perform the method of real-time broadcast audience engagement in accordance with one or more embodiments of the present invention.

Advantages of one or more embodiments of the present invention may include one or more of the following:

In one or more embodiments of the present invention, a method and system for real-time broadcast audience engagement provides a simple, efficient, and reliable way for broadcast shows to monitor, track, and manage their broadcast audience engagement in real-time.

In one or more embodiments of the present invention, a method and system for real-time broadcast audience engagement allows broadcast shows to modify their content and improve engagement based on their real-time broadcast audience engagement.

In one or more embodiments of the present invention, a method and system for real-time broadcast audience engagement allows audience members to anonymously provide their opinion on the performance or content of a broadcast show in real-time that is markedly different from, more efficient than, and more effective than traditional sources of audience feedback that are typically not in real-time, resource limited, and discourage audience participation.

In one or more embodiments of the present invention, a method and system for real-time broadcast audience engagement encourages audience members to provide honest and genuine feedback on the performance of the broadcast show they are listening to in real-time. Because the audience engagement is anonymous, audience members are free to share their opinions without being identified or feeling judged.

In one or more embodiments of the present invention, a method and system for real-time broadcast audience engagement provides a simple user interface that allows users to provide simple, efficient, and reliable binary feedback in real-time. For example, in certain embodiments, a user may simply touch or click on the "thumbs-up" or the "thumbs-down" icon on their smart phone to voice their anonymous opinion in real-time about the content of the broadcast show.

In one or more embodiments of the present invention, a method and system for real-time broadcast audience engagement improves listenership or viewership by providing a platform for simple, efficient, and reliable audience participation that makes audience members feel like they have a voice and are part of a larger community.

In one or more embodiments of the present invention, a method and system for real-time broadcast audience engagement improves engagement because it appeals to a substantially larger segment of the listening or viewing audience. It is simpler, more efficient, and more reliable than traditional sources of feedback and requires very little effort on the part of the audience member.

In one or more embodiments of the present invention, a method and system for real-time broadcast audience engagement is less time consuming, less costly, and more reliable than attempts to measure engagement through traditional sources of feedback such as surveys ratings, call-in lines, and social media which lack immediacy.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of real-time broadcast audience engagement comprising:
   identifying a plurality of shows currently being broadcast live;
   providing a list of shows currently being broadcast to an audience member;
   receiving the audience member's selection of a show from the list;
   providing the audience member with a binary reaction interface for the selected show;
   receiving the audience member's binary reaction based on the audience member's interaction with the binary reaction interface;
   aggregating binary reactions from a plurality of audience members for the selected show;
   providing the selected show a real-time summary of the plurality of binary reactions from the plurality of audience members; and
   providing the selected show a real-time summary of one or more metrics of audience engagement,
   wherein a first metric of audience engagement comprises an engagement score calculated by dividing a total number of binary reactions received for the selected show in a predetermined period of time by a total number of audience members for the selected show, multiplied by a normalization factor, and
   wherein a second metric of audience engagement comprises a comparison-to-market engagement score calculated by subtracting an average engagement score for other shows in the market from the engagement score for the selected show.

2. The method of claim 1, further comprising:
   providing the selected show one or more of a real-time total number of active audience members in a market, a total number of active audience members for the selected show, and a percentage of active audience members for the selected show in the market.

3. The method of claim 1, further comprising:
providing the audience member with a poll interface;
receiving the audience member's poll response based on the audience member's interaction with the poll interface;
aggregating poll responses from a plurality of audience members for the selected show; and
providing the selected show a real-time summary of the plurality of poll responses from the plurality of audience members.

4. The method of claim 1, further comprising:
providing the audience member with an advertisement interface;
receiving the audience member's advertisement engagement based on the audience member's interaction with the advertisement interface;
aggregating advertisement engagements from a plurality of audience members for the selected show; and
providing the selected show a real-time summary of the plurality of advertisement engagements from the plurality of audience members.

5. The method of claim 1, wherein the audience member's binary reaction corresponds to a positive reaction or negative reaction of the audience member.

6. The method of claim 1, wherein the binary reaction interface comprises a visual depiction of a positive reaction and a visual depiction of a negative reaction.

7. The method of claim 1, wherein the audience member's binary reaction is received on a restricted interval.

8. The method of claim 1, wherein the real-time summary of the plurality of binary reactions from the plurality of audience members comprises a rolling average of positive reactions and a rolling average of negative reactions.

9. The method of claim 1, wherein a third metric of audience engagement comprises a comparison-to-national engagement score calculated by subtracting an average engagement score for other shows nationwide from the engagement score for the selected show.

10. The method of claim 1, wherein the real-time summary of the plurality of binary reactions from the plurality of audience members comprises one or more of a rolling average of an engagement score, a rolling average of a comparison-to-market engagement score, and a rolling average of a comparison-to-national engagement score.

11. The method of claim 1, wherein the list of shows currently available comprises one or more of local talk shows, terrestrial radio shows, satellite radio shows, terrestrial television shows, satellite television shows, cable television shows, syndicated shows, streaming shows, podcast shows, or web-based shows that are currently being broadcast live.

12. A non-transitory computer readable medium comprising software instructions that, when executed by a processor, perform a method of real-time broadcast audience engagement comprising:
identifying a plurality of shows currently being broadcast live;
providing a list of shows currently being broadcast to an audience member;
receiving the audience member's selection of a show from the list;
providing the audience member with a binary reaction interface for the selected show;
receiving the audience member's binary reaction based on the audience member's interaction with the binary reaction interface;
aggregating binary reactions from a plurality of audience members for the selected show;
providing the selected show a real-time summary of the plurality of binary reactions from the plurality of audience members; and
providing the selected show a real-time summary of one or more metrics of audience engagement,
wherein a first metric of audience engagement comprises an engagement score calculated by dividing a total number of binary reactions received for the selected show in a predetermined period of time by a total number of audience members for the selected show, multiplied by a normalization factor, and
wherein a second metric of audience engagement comprises a comparison-to-market engagement score calculated by subtracting an average engagement score for other shows in the market from the engagement score for the selected show.

13. The non-transitory computer readable medium of claim 12, further comprising:
providing the selected show one or more of a real-time total number of active audience members in a market, a total number of active audience members for the selected show, and a percentage of active audience members for the selected show in the market.

14. The non-transitory computer readable medium of claim 12, further comprising:
providing the audience member with a poll interface;
receiving the audience member's poll response based on the audience member's interaction with the poll interface;
aggregating poll responses from a plurality of audience members for the selected show; and
providing the selected show a real-time summary of the plurality of poll responses from the plurality of audience members.

15. The non-transitory computer readable medium of claim 12, further comprising:
providing the audience member with an advertisement interface;
receiving the audience member's advertisement engagement based on the audience member's interaction with the advertisement interface;
aggregating advertisement engagements from a plurality of audience members for the selected show; and
providing the selected show a real-time summary of the plurality of advertisement engagements from the plurality of audience members.

16. The non-transitory computer readable medium of claim 12, wherein the audience member's binary reaction corresponds to a positive reaction or negative reaction of the audience member.

17. The non-transitory computer readable medium of claim 12, wherein the binary reaction interface comprises a visual depiction of a positive reaction and a visual depiction of a negative reaction.

18. The non-transitory computer readable medium of claim 12, wherein the audience member's binary reaction is received on a restricted interval.

19. The non-transitory computer readable medium of claim 12, wherein the real-time summary of the plurality of binary reactions from the plurality of audience members comprises a rolling average of positive reactions and a rolling average of negative reactions.

20. The non-transitory computer readable medium of claim 12, wherein a third metric of audience engagement comprises a comparison-to-national engagement score calculated by subtracting an average engagement score for other shows nationwide from the engagement score for the selected show.

21. The non-transitory computer readable medium of claim 12, wherein the real-time summary of the plurality of binary reactions from the plurality of audience members comprises one or more of a rolling average of an engagement score, a rolling average of a comparison-to-market engagement score, and a rolling average of a comparison-to-national engagement score.

22. The non-transitory computer readable medium of claim 12, wherein the list of shows currently available comprises one or more of local talk shows, terrestrial radio shows, satellite radio shows, terrestrial television shows, satellite television shows, cable television shows, syndicated shows, streaming shows, podcast shows, or web-based shows that are currently being broadcast live.

* * * * *